United States Patent [19]

Pittinger, Sr. et al.

[11] 4,338,720
[45] Jul. 13, 1982

[54] HOUSING AND FRAME SYSTEM FOR VEGETATION FILAMENT TRIMMER

[76] Inventors: Charles B. Pittinger, Sr., 902 N. Lake Dr., Weatherford, Tex. 76086; Charles B. Pittinger, Jr., 320 Cockeys Mill Rd., Reisterstown, Md. 21136

[21] Appl. No.: 184,479

[22] Filed: Sep. 5, 1980

[51] Int. Cl.³ .............................................. A01D 50/00
[52] U.S. Cl. ..................................................... 30/276
[58] Field of Search ..................... 30/276, 347, 296 R; 56/12.7

[56] References Cited
U.S. PATENT DOCUMENTS

| | | | |
|---|---|---|---|
| D. 255,640 | 1/1980 | Pittinger | D8/8 |
| 3,892,037 | 7/1975 | Brown | 30/276 |
| 4,125,339 | 11/1978 | Pittinger, Sr. et al. | 403/348 |
| 4,134,204 | 1/1979 | Perdue | 30/276 |
| 4,136,446 | 1/1979 | Tripp | 30/276 |
| 4,156,967 | 6/1979 | Ballas | 30/276 |

*Primary Examiner*—Jimmy C. Peters
*Attorney, Agent, or Firm*—John F. McClellan, Sr.

[57] ABSTRACT

Filament trimmer structure comprising a screw-free or unitary dual shank, balancing handle, housing and elongate handle portion, the handle portion having a lateral cover plate; the dual shank both protecting in a first tubular part a contained electric lead and through a second tubular part venting air from a chaff-free location at a handle upper portion, downward into the housing.

10 Claims, 3 Drawing Figures

U.S. Patent        Jul. 13, 1982        4,338,720
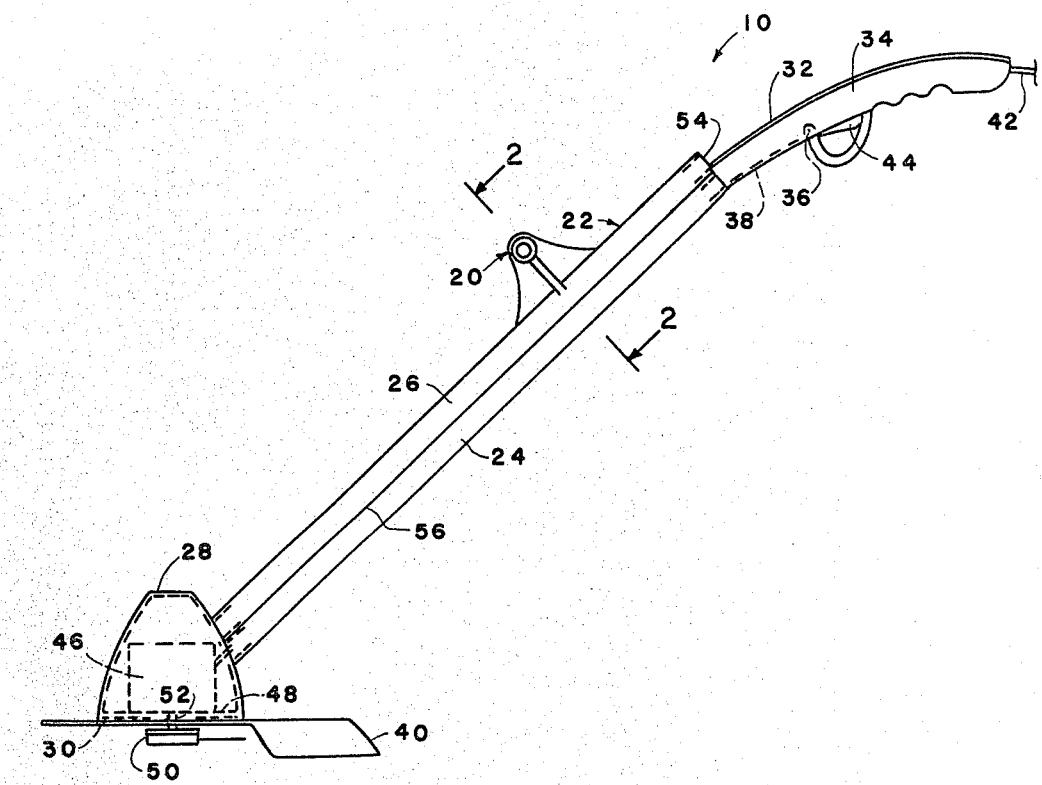
FIG. 1
FIG. 2
FIG. 3
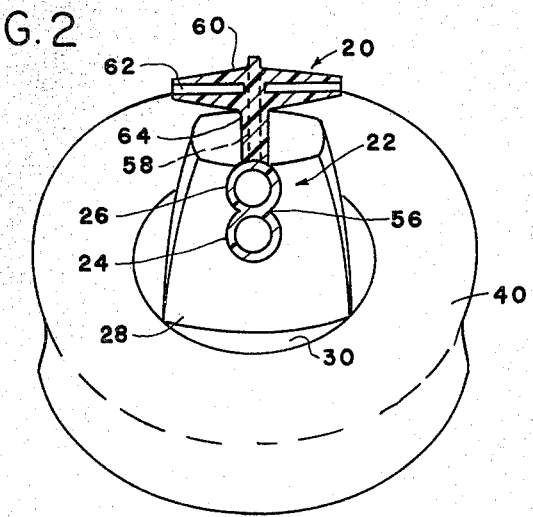

HOUSING AND FRAME SYSTEM FOR VEGETATION FILAMENT TRIMMER

Cross-reference is made to our co-pending application for U.S. Pat. Ser. No. 43,516, filed 5-17-79 for Motor Housing System FOR Vegetation Filament Trimmer of which this Application is a continuation-in-part, and which is abandoned as of the filing of this Application.

FIELD OF THE INVENTION

This invention relates generally to housing systems and particularly to a novel comprehensive housing and frame system for a vegetation filament trimmer.

BACKGROUND OF THE INVENTION

Our referenced co-pending application discloses a motor housing for an electric motor drive for a filament trimmer, in the shape of an inverted truncated cone with an open bottom. The top is closed except for two openings, each with a tube leading from it. The two tubes are in a radial plane in over-and-under relation with each other at an upward angle. The two tubes have integral connection with the housing, are parallel, and have an integral web connecting them with each other and with the housing. The upper portion of the front tube is a freestanding cylindrical filter-tower. The rear tube is a socket for a separate tubular shank conventionally securable in it, by machine screws, and leading up for conventional securance, by machine screws also, of a handle on the upper end, from which electric power leads pass down through the tubular shank to the housing.

However, in spite of the advantages of the previous invention, it was not directed at solving all problems of assembly common to tools of this nature. The electric leads were safely treated but some care was required on assembling the handle, particularly if assembled by a purchaser. In other designs manufacturer's recalls have resulted from displacement of wiring at joints and screw damage to insulation of the wiring by screws passed through assembly holes. Partial disassembly in use has been a threat. The result has been loss of time and money in addition to safety hazards including lethal electric shock.

Further, the air filters, although somewhat above the housing, have still been in position to pick up trimming-chaff and dust, requiring periodic attention to prevent collection that throttles air flow to hot areas of the electric motor and collection of chaff there, which can comprise a fire hazard.

OBJECTS OF THE INVENTION

Principal objects of the present invention are to provide a more economical, safer and easier to assemble housing and frame system for filament trimmers, which efficiently and safely cools the motor housed in it, without need for periodic attention, and which is at the same time preferentially stiff and sturdy in the load direction, resulting in efficient light weight construction, and which has a novel pleasing appearance.

Further objects are to provide a system as described which requires fewer manufacturing operations, which cannot pull apart under normal loads; which prevents tension loading of the electric leads contained, and prevents screw damage of the insulation of the electric leads, and which is easy on the user in operation.

BRIEF SUMMARY OF THE PREFERRED EMBODIMENT

In brief summary given as cursive description only and not as limitation, the invention includes filament trimmer structure comprising a screw-free or unitary dual shank, balancing handle, housing and elongate handle portion, the handle portion having a lateral cover plate; the dual shank both protecting in a first tubular part a contained electric lead and through a second tubular part venting air from a chaff-free location at a handle upper portion, downward into the housing.

BRIEF DESCRIPTION OF THE DRAWINGS

The above and other advantages and objects of the invention will become more rapidly apparent on examination of the following description including the drawings, in which like characters refer to like parts.

FIG. 1 is a side elevational view;

FIG. 2 is a partly sectional view adapted from 2—2, FIG. 1; and on a larger scale; and FIG. 3 is a fragmentary detail showing the handle portion in FIG. 1 with the cover plate removed, at the junction with the shank portion.

DETAILED DESCRIPTION OF THE PREFERRED EMBODIMENT

FIG. 1 shows the invention in embodiment 10 as comprising a unitary structure except for two elements. The heart of the structure is a low-cost, high-strength, low weight, one piece molding comprising integral balance handle 20, shank 22 with integral conduit tube 24 and extension tube 26, integral motor cover 28 and retainer 30, and integral pistol-grip handle 32 with conventional, generally flat cover plate 34 on the pistol grip handle. The cover plate may be detachably secured as by screws 36 which do not penetrate the interior but instead secure through solid peripheral portions 38. Conventionally shaped guard 40 may be detachably secured to the retainer 30 by means disclosed in U.S. Pat. No. 4,125,339 issued to C. B. Pittinger, Sr. and C. B. Pittinger, Jr. on Nov. 14, 1978.

The power cord 42 leads-in through the butt of the pistol grip handle, preferably through a fairlead of the type shown in U.S. Pat. No. D255,640 issued to C. B. Pittinger, Sr. on July 1, 1980. The power cord then passes to conventional switching trigger 44 and down the shank conduit tube portion 24 to a conventional electric motor 46 conventionally secured, as to bottom bars 48 at the motor housing. This patent also shows a preferred type of balance handle.

Filament-holding and down-exhausting fan structure 50 may be of any conventional structure mounted on the motor shaft 52.

Cooling air passing down through and around the motor and out the housing bottom is kept substantially chaff-free and dust-free according to this invention by being taken in at the highest location not interfering with handgrip. Intake 54 is a full, unrestricted tubular opening at the top of the shank where the extension tube 26 ends, and is well above balance handle 20 and in position preferably permitting the extension tube to reinforce the pistol grip handle connection to the shank. The extension tube preferably continuous connection 56 to the conduit tube along the full length, and to the motor housing, reinforces and stiffens the whole assembly, permitting it to be made lighter in weight without sacrificing strength.

The XYZ aspect ratio (length to cross-sectional size) is compact and yet produces good airflow and adequate room for the electric wire, as further indicated by the proportions in the next Figure. Also evident from these two Figures is the shank beam-stiffness and strength in the vertical or primary load direction, coupled with good strength and stiffness laterally, yielding efficient lightweight construction.

FIG. 2 shows a cross-sectional view through the balance handle 20 and adjacent shank portion 22.

The conduit tube 24 and extension tube 26 between them form a substantially uniformly-thick-wall figure-eight; the loops becoming one at 56. Symmetrically joining the extension tube in the vertical plane is the flange 58 of the balancing handle 20, the grip portion 60 of which is preferably a transverse "T", each half of which has a coaxial bore 62 separated by the flange thickness. Side buttresses 64 may be employed to stiffen the flange.

In this view the upper part of the housing 28 is shown as a rounded truncated pyramid; the guard retainer portion 30 is preferably circular with oval or rounded sides.

FIG. 3 is a diagrammatic detail of the junction of the pistol-grip handle 32 and the conduit tube 24 and extension tube 26. It is evident that the lower part of the extension tube wall can contribute reinforcement to this junction without throttling airflow, as well as the full height of the conduit tube. Elimination of need for a strainer or a perforate cap on the extension tube permits equal or greater airflow than customary, without increasing tube size.

In a typical range the dimensions of the unit can be, in proportion:

length overall; 40–72 inches (1 to 1.8 m)
shank length: 25 to 42 inches (63 to 1.05 m)
length from lower end of shank to balancing handle: 22 to 50 inches (0.55 to 1.2 m)
inside diameter of extension tube and conduit tube: $\frac{3}{8}$ to $1\frac{1}{4}$ inches (0.9 to 3 cm)
outside diameter of extension tube and conduit: $\frac{1}{2}$ to $1\frac{1}{2}$ inches (1.2 cm to 3.7 cm)

Material for the unit can be ABS, Nylon or any other conventional thermoplastic of thermosetting plastic.

From the above it will be appreciated that the unique construction of this invention cools the motor with clean air, cannot pull apart longitudinally, frees the assembly process from electric lead damage from screw punctures, provides efficient bending and torsional stiffness and strength through the double tubular, and unitary features, and is pleasing in appearance. Although the preferred mode is set out above, it will also be evident that the dual tubes could be embodied side-by-side rather than over-and-under within the scope of the invention. Further, the joining of the conduit tube and the extension tube could be discontinuous in part, but continuous joining is preferred for reduced stress concentration and greater protection. It will be evident that the dual tube construction could comprise other than the cylindrical tubes described and preferred for low stress concentration.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by United States Letters Patent is:

1. In a system for trimming vegetation, having a housing, a shank connecting with the housing and serving as a conduit tube for an electric lead, air venting means for conducting cooling air to a motor within the housing, and means for holding connecting with the shank and including an elongate handle and a balancing handle, the improvement comprising in combination: the shank including dual tubes co-extensive from the housing to the elongate handle, a first of said dual tubes located for serving as a said conduit tube, a second of said dual tubes located as an extension tube for carrying clean air from a point relatively free of trimmings at an upper part of the handle downward through said housing, means connecting said dual tubes along said co-extension, and means for protecting an electric lead within said system from abrasion upon assembly in said system comprising all said housing, dual tubes and handle portion being on unitary structure free of fasteners for interconnecting same.

2. In a system as recited in claim 1, the conduit tube and the extension tube being in over-and-under relation.

3. In a system as recited in claim 2, and said means for protecting electric lead within said system from abrasion further including said balancing handle being an integral part of said one unitary structure.

4. In a system as recited in claim 3, the balancing handle being a unitary part of said shank.

5. In a system as recited in claim 3, the conduit tube being below the extension tube.

6. In a system as recited in claim 5, the conduit tube and the extension tube being joined in figure-eight cross-section shape.

7. In a system as recited in claim 6, said figure-eight having substantially uniform wall thickness.

8. In a system as recited in claim 6, said joining of the conduit tube and the extension tube being continuous.

9. In a system as recited in claim 2, the extension tube having an intake for said clean air which is in cross-sectional size the full inside opening of said extension tube.

10. In a system as recited in claim 9, said intake being free of filter structure and the like.

* * * * *